United States Patent
Cunico et al.

(10) Patent No.: US 9,338,302 B2
(45) Date of Patent: May 10, 2016

(54) PHONE CALL PLAYBACK WITH INTELLIGENT NOTIFICATION

(71) Applicant: International Business Machines Corporation, Armonk, NY (US)

(72) Inventors: Hernan A. Cunico, Holly Springs, NC (US); David L. Rostocil, Jr., Arlington, MA (US); Asima Silva, Holden, MA (US)

(73) Assignee: International Business Machines Corporation, Armonk, NE (US)

( * ) Notice: Subject to any disclaimer, the term of this patent is extended or adjusted under 35 U.S.C. 154(b) by 0 days.

(21) Appl. No.: 14/266,932

(22) Filed: May 1, 2014

(65) Prior Publication Data

US 2015/0319309 A1 Nov. 5, 2015

(51) Int. Cl.
| | |
|---|---|
| *H04M 3/42* | (2006.01) |
| *H04M 3/56* | (2006.01) |
| *G06F 17/28* | (2006.01) |
| *H04L 12/16* | (2006.01) |
| *H04L 12/66* | (2006.01) |

(52) U.S. Cl.
CPC ............. *H04M 3/568* (2013.01); *G06F 17/28* (2013.01)

(58) Field of Classification Search
CPC .............. H04M 2201/40; H04M 3/56; H04M 3/42221; H04M 3/42323; H04M 3/564; H04M 3/567; H04M 2201/41; H04M 3/424; H04M 3/568; H04M 2203/301; H04M 2203/5072; H04M 2250/74; G10L 15/1815; G10L 15/26; G10L 17/00; G10L 25/84; H04L 12/1831; H04L 12/1827; H04L 12/1822; H04L 65/4038; H04L 65/403; H04L 12/1818; H04L 29/06027

USPC .......... 379/202.01, 158, 164, 230.01, 204.01, 379/205.01, 88.01, 88.12; 370/260, 352, 370/353
See application file for complete search history.

(56) References Cited

U.S. PATENT DOCUMENTS

| | | | |
|---|---|---|---|
| 7,191,129 B2 | 3/2007 | Brown et al. | |
| 7,634,254 B2 | 12/2009 | Xie | |
| 8,139,721 B2 | 3/2012 | O'Connell et al. | |
| 8,345,849 B2 | 1/2013 | Lee et al. | |
| 8,380,521 B1* | 2/2013 | Maganti et al. | 704/275 |
| 8,416,714 B2* | 4/2013 | Agapi et al. | 370/260 |
| 8,593,501 B1* | 11/2013 | Kjeldaas | H04N 7/15 348/14.01 |
| 2003/0032447 A1 | 2/2003 | Bulthuis | |
| 2003/0210768 A1 | 11/2003 | Sahasrabudhe | |
| 2004/0131161 A1* | 7/2004 | Schwartz et al. | 379/68 |
| 2004/0184586 A1* | 9/2004 | Coles et al. | 379/88.14 |
| 2004/0190700 A1* | 9/2004 | Cutaia et al. | 379/202.01 |
| 2004/0207724 A1 | 10/2004 | Crouch et al. | |
| 2005/0123285 A1 | 6/2005 | Boys | |
| 2006/0003751 A1 | 1/2006 | Vo | |
| 2007/0106724 A1* | 5/2007 | Gorti | G06Q 10/10 709/204 |
| 2007/0133437 A1* | 6/2007 | Wengrovitz et al. | 370/260 |
| 2007/0156811 A1* | 7/2007 | Jain et al. | 709/204 |

(Continued)

*Primary Examiner* — Ahmad F Matar
*Assistant Examiner* — Kharye Pope
(74) *Attorney, Agent, or Firm* — Ryan Lewis; David Zwick

(57) ABSTRACT

Notifying a participant in a teleconference while the teleconference is in progress. The telecommunication device receives audio data representing natural language spoken during a teleconference in progress. The telecommunication device determines if information associated with a participant in the teleconference in progress is in the natural language audio data. Responsive to determining that information associated with the participant in the teleconference in progress is in the natural language audio data, notifying, by the telecommunication device, the participant.

14 Claims, 6 Drawing Sheets

(56) References Cited

U.S. PATENT DOCUMENTS

| | | | |
|---|---|---|---|
| 2008/0137558 A1* | 6/2008 | Baird | 370/260 |
| 2008/0232556 A1* | 9/2008 | Gilbert et al. | 379/88.01 |
| 2009/0296908 A1* | 12/2009 | Lee et al. | 379/202.01 |
| 2009/0326939 A1 | 12/2009 | Toner et al. | |
| 2010/0061539 A1* | 3/2010 | Cloran | G06Q 30/02 379/202.01 |
| 2011/0131276 A1 | 6/2011 | Cadou et al. | |
| 2011/0267419 A1* | 11/2011 | Quinn | H04N 7/15 348/14.08 |
| 2012/0323575 A1* | 12/2012 | Gibbon | G11B 27/28 704/246 |
| 2013/0144603 A1* | 6/2013 | Lord et al. | 704/9 |

\* cited by examiner

US 9,338,302 B2

PHONE CALL PLAYBACK WITH INTELLIGENT NOTIFICATION

BACKGROUND

The present disclosure relates generally to speech signal processing, and more particularly, to word recognition to intelligently notify participants in a real-time phone call.

A telephone conversation is a forum in which participants attempt to transfer information in real time to one another via means such as voice. Under field conditions, a voice conversation conducted via a telephone network can be difficult to hear by a listener due to noise interference or because the listener is distracted by external events. Instant playback can allow the listener to repeat a portion of the real-time telephone conversation missed. The listener can continue to listen to the conversation in a delayed mode or reset to real-time to continue the conversation real time.

SUMMARY

Embodiments of the present disclosure disclose a method, computer program product, and system for notifying a participant in a teleconference while the teleconference is in progress. The telecommunication device receives audio data representing natural language spoken during a teleconference in progress. The telecommunication device determines if information associated with a participant in the teleconference in progress is in the natural language audio data. Responsive to determining that information associated with the participant in the teleconference in progress is in the natural language audio data, notifying, by the telecommunication device, the participant.

In another aspect, the telecommunication device records the natural language audio data from the teleconference in progress and responsive to receiving a playback request during the teleconference in progress: playing back, by the telecommunication device, a section of the recorded natural language audio data and responsive to receiving a playback exit request, returning, by the telecommunication device, to the teleconference in progress.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Some telecommunication devices and teleconference systems are capable of establishing real-time communications for more than two participants. Certain participants may occasionally join the teleconference after the start of the teleconference, may lose connection during the teleconference, may have difficulty hearing other participants in the teleconference, or may be distracted from the teleconference. When this occurs, the participant may interrupt the teleconference to be "briefed" on any missed information. Some late-comers to a teleconference may join the teleconference already in progress, without the benefit of being briefed on the missed information.

Including a memory element in personal telecommunication devices and teleconference systems to record either all or a portion of the teleconference may allow for an instant playback of some or all of the recorded teleconference, even while the real-time teleconference continues.

Unfortunately, since the real-time teleconference continues while a participant has their telecommunication device in playback mode listening to the recording, the participant may be unaware that they are mentioned in the real-time teleconference or that their input may be required in the real-time teleconference.

Embodiments of the present disclosure may advantageously notify the participant when their attention may be needed in the real-time teleconference. In various embodiments, the natural language of the teleconference may be monitored, and if a participant's name is detected, the participant may be notified. Certain embodiments may also notify the participant when other information identifying the participant is detected, such as the participant's title and area of expertise. Certain embodiments may only notify a participant while the participant's telecommunication device is in playback mode. Other embodiments may notify the participant whenever they may be needed in the real-time teleconference, whether the telecommunication device is in playback mode or not, allowing an inattentive participant to be notified that they may be needed.

Various embodiments may immediately exit playback mode and connect to the real-time teleconference when a notification occurs. Other embodiments may provide options and controls as to whether or not a reconnect to the real-time teleconference occurs as a result of a notification. The telecommunication device may provide options to continue in playback mode and not reconnect to the real-time teleconference, to fast-forward through the recording until reaching real-time, or to exit playback mode immediately and reconnect to the real-time teleconference.

Figure 1:
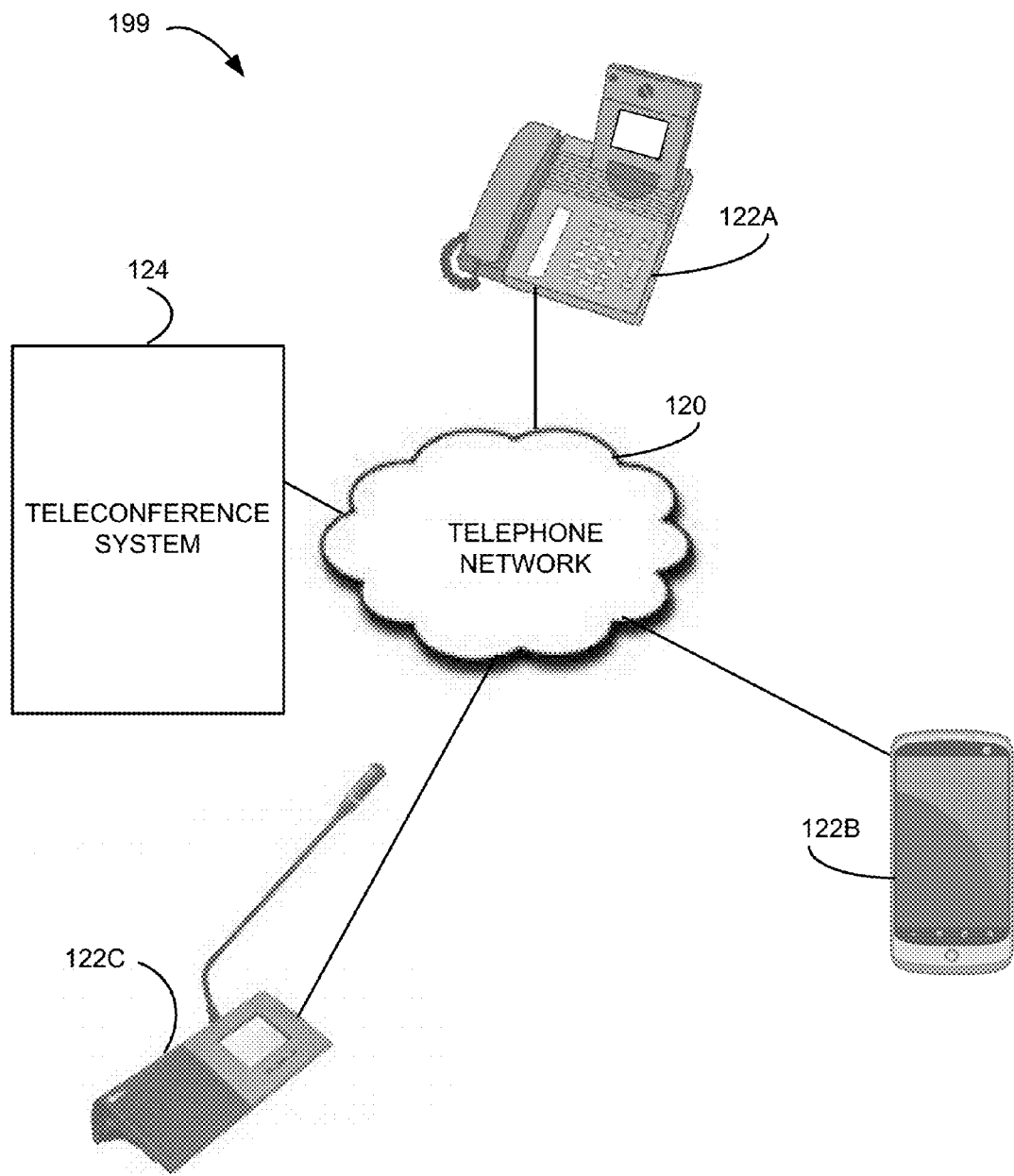
FIG. 1 is a block diagram of an exemplary telecommunication environment, in accordance with an embodiment of the disclosure.

FIG. 1 is a block diagram of an exemplary telecommunication environment 199, in accordance with an embodiment of the disclosure. Telecommunication environment 199 includes a telephone network 120 employed to route calls between telecommunications devices 122A, 122B, 122C. Telecommunication devices 122 may be personal telecommunication devices such as personal telephones. Telecommunications devices 122 may include wired telephones, wireless telephones, computers, or any other device supporting teleconference communications. Teleconference system 124 represents the functionality and systems required to provide teleconferencing services to telecommunication devices 122. Teleconference system 124 may be a separate device attached to telephone network 120, or may represent functionality and systems that are integrated into, for example, a central office switch or a private branch exchange (PBX) system.

One or more of the telecommunication devices 122 and/or teleconference system 124 may be enabled to record all or a portion of a teleconference and play back the recording while the real-time teleconference continues. One or more of the telecommunication devices 122 and/or teleconference system 124 may be enabled to notify the participant that they may be needed in the teleconference.

Telecommunication devices 122 and/or teleconference system 124 may provide functions including, but not limited to, start record, end record, pause record, start playback, playback fast forward, pause playback, playback rewind, and playback exit for recording a teleconference conversation, playing back the recorded teleconference conversation, and reconnecting to the real-time teleconference. In various embodiments, these functions may be controlled either by voice activated controls or physical controls, such as keys, buttons, and menus.

Telecommunications devices 122 may also provide notification mechanisms such as lights, sounds, screen messages, and vibrations on the physical telecommunication device. In an embodiment, teleconference system 124 may cause notifications, such as lights, sounds, screen messages, and vibrations on telecommunication devices 122. In various embodiments, the notification mechanisms may be audible sounds, such as beeps or a recorded message heard through the speaker of a telecommunication device 122. In various embodiments, these features may be controlled either by voice activated controls or physical controls, such as keys, buttons, and menus.

Figure 2:
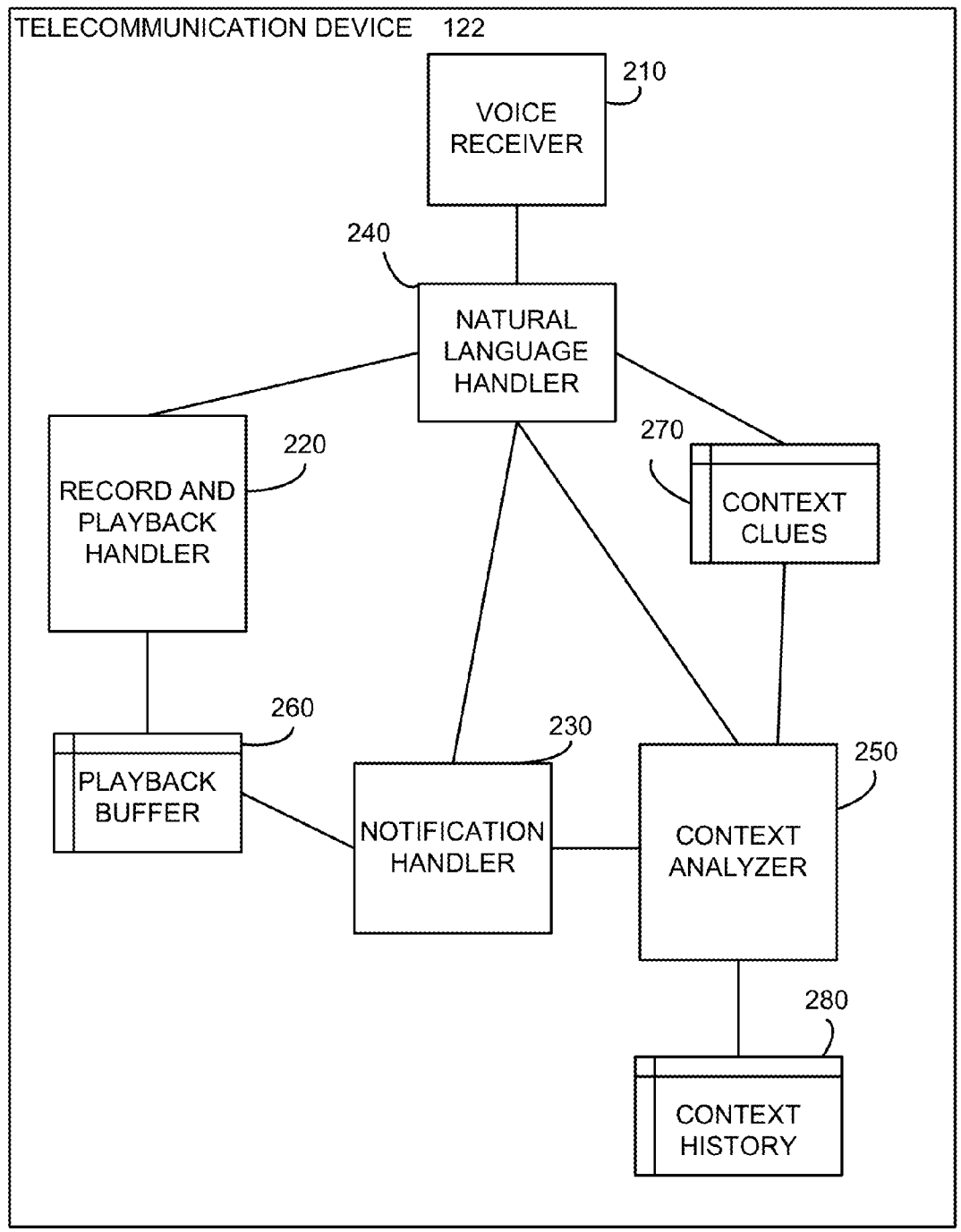
FIG. 2 illustrates a functional block diagram of an exemplary telecommunications device, in accordance with an embodiment of the disclosure.
Figure 6:
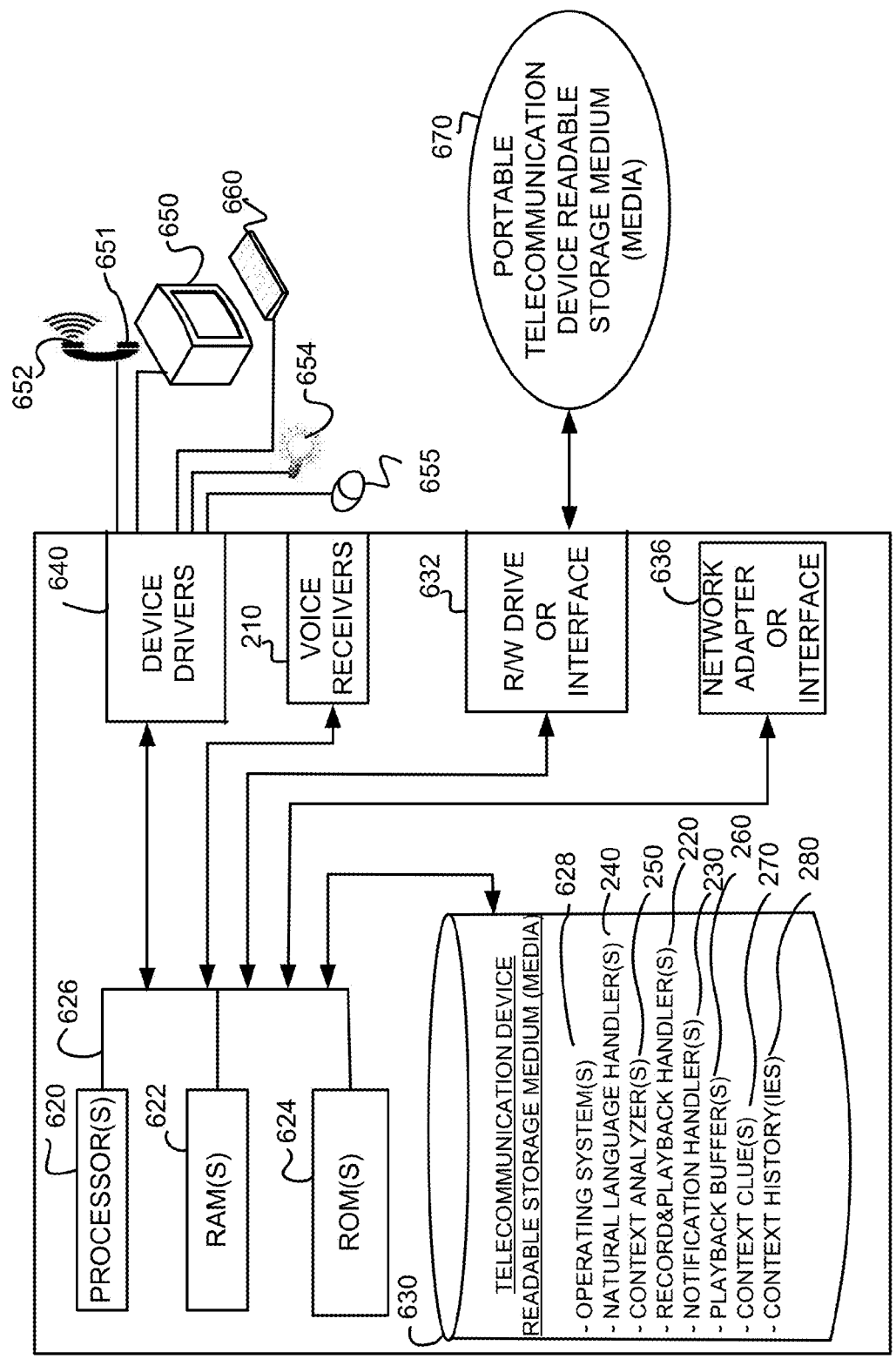
FIG. 6 depicts a block diagram of components of the telecommunication device of a telecommunication environment, in accordance with an embodiment of the disclosure.

FIG. 2 illustrates a functional block diagram of an exemplary telecommunications device 122, in accordance with an embodiment of the disclosure. Telecommunication device 122 represents a personal telecommunication device that may include a voice receiver 210, a record and playback handler 220, a notification handler 230, a natural language handler 240, a context analyzer 250, one or more playback buffers 260, one or more context clues 270, and one or more context histories 280, all of which may be stored, for example, on a telecommunication device readable storage medium, such as telecommunication device readable storage medium (media) 630 (FIG. 6) or portable telecommunication device readable storage medium (media) 670 (FIG. 6). While the exemplary embodiment describes these components as included in a telecommunication device 122, it will be recognized by one of skill in the art that these components may be included, for example, in teleconference system 124, and accessed by a telecommunication device 122 via, for example, voice commands or physical controls, such as keys, buttons, and menus.

Voice receiver 210 may, in various embodiments, be a component of the telecommunication device 122 that receives the natural language voice input of a teleconference participant utilizing telecommunication device 122. Voice receiver 210 may convert the voice input, or natural language audio data, into a digital data format that can be interpreted by a natural language processor. Voice input may include, but is not limited to, conversation input, voice activated record controls, voice activated playback controls, voice activated notification controls, and context information. Voice receiver 210 may pass all voice input received to natural language handler 240 to be processed.

In various embodiments, natural language handler 240 may be a natural language processor that interprets the voice input received by voice receiver 210 to determine what information has been received. Natural language handler 240 may be any known algorithms that utilize linguistics, semantics and syntax to tokenize words and sentences and extract information and meaning from natural languages, in accordance with an embodiment of the invention. Voice input determined by natural language handler 240 to be voice activated record or playback requests, or controls, may be sent to record and playback handler 220. In certain embodiments, the use of record and playback controls may be limited to a telecommunication device 122 capable of recording and playing back the teleconference conversation. In other embodiments, record and playback controls may be available through a teleconference system.

Voice input determined by natural language handler 240 to be voice activated notification controls may be sent to notification handler 230. In certain embodiments notification controls may set notification options that include, but are not limited to, setting a preferred notification type (beeps, flashing lights, etc.), setting a playback mode action, enabling/disabling all notifications, enabling/disabling playback mode notifications, and enabling/disabling real-time mode notifications. In certain embodiments, the use of notification controls may be limited to a telecommunication device 122 capable of notification. In other embodiments, notification controls may be available through a teleconference system.

Voice input determined by natural language handler 240 to be context information may be stored in the telecommunication device 122 as context clues 270. Context information may include participant name, participant area of expertise, participant location, and any other natural language handler 240 input determined to be context information that may aid context analyzer 250 in recognizing that the participant's input may be needed in the teleconference. Various embodiments may include specific commands or keywords to signal natural language handler 240 that the voice input that follows should be considered context information.

Various embodiments may store context clues 270 in non-volatile memory in the telecommunication device 122 to be retained between teleconferences. Context clues 270 may, in various embodiments, be modified between teleconferences and during teleconferences. In various embodiments, context clues 270 may be specific to, and stored in the telecommunication device 122, such as a participant's personal smart phone. In other embodiments, context clues 270 may be stored in a teleconference system and associated with a teleconference participant when the participant joins the teleconference and identifies himself. Certain embodiments may discard the context clues 270 when the teleconference ends.

Voice input determined by natural language handler 240 to be teleconference conversation may, in various embodiments, be sent to both record and playback handler 220, to be recorded, and to context analyzer 250 to be analyzed.

In various embodiments, record and playback handler 220 may receive the teleconference conversation as input from natural language handler 240 to be recorded in playback buffer 260. In certain embodiments, record and playback handler 220 may notify all teleconference participants that the conversation is being recorded. In certain embodiments, playback buffer 260 capacity may be limited and the teleconference conversation may be recorded in a circular manner in the playback buffer 260, such that when the playback buffer 260 fills, earlier recorded conversation may be recorded over. Circular recording may limit the amount of teleconference conversation recorded and the amount of recorded teleconference conversation capable of being played back.

Record and playback handler 220 may also receive record controls and playback controls as input. For embodiments in which record and playback controls are voice activated, input may be received from natural language handler 240. In other embodiments, record and playback control input may be received as a result of button, key, or menu input. Record and playback handler 220 may initiate the recording of a teleconference conversation in playback buffer 260 in response to record control input. In certain embodiments, teleconference conversations may always be recorded, not relying on record control input. Record controls may include, but are not limited to, start—to start the recording of a teleconference conversation in the playback buffer 260, stop—to stop the recording of the teleconference conversation, pauserecord—to pause the recording of the teleconference conversation, rewind—to quickly move backward in the playback buffer 260 to any location between the current playback location and the beginning of the playback buffer 260, play—to initiate a playback of the playback buffer 260 from the current playback location, fast forward—to quickly move forward in the playback buffer 260 to any location between the current playback location and the real-time teleconference, pauseplayback—to pause the playback of the playback buffer 260 at the current playback location, and exit—to immediately exit playback mode and reconnect to the real-time teleconference.

Playback buffer 260 may be volatile or non-volatile storage in telecommunication device 122 or teleconference system 124 that allows some or all of the teleconference conversation to be recorded. In certain embodiments, record and playback handler 220 may erase the playback buffer 260 after the telecommunication device 122 disconnects from the teleconference. In other embodiments, teleconference system 124 may save a permanent archival version of the conversation before the playback buffer 260 is erased.

In various embodiments, context analyzer 250 may receive the real-time teleconference conversation as input from natural language handler 240. Context analyzer 250 may analyze the conversation input utilizing context clues 270 and context history 280 to determine if notification criterion has been met and whether notification handler 230 should be signaled. Context clues 270 may include, for example, a name, area of expertise, and location of the participant. Context analyzer 250 may utilize semantic analysis to match the context clues 270 with the teleconference conversation and signal notification handler 230 when a match occurs. In various embodiments, context analyzer 250 may have a plurality of signals for notification handler 230 with different signals for different context clues 270 matched. In certain embodiments, context analyzer 250 may add, delete or modify context clues 270 resulting from the analysis of the teleconference conversation. For example, if a name matching the name in context clues 270 is mentioned in association with specific skills or projects that are not already in context clues 270, context analyzer 250 may add them to context clues 270.

In various embodiments, context analyzer 250 may also maintain a context history 280 that persists after the telecommunication device 122 disconnects from the teleconference. In certain embodiments, context analyzer 250 may recognize patterns from previous teleconference conversations maintained in context history 280, among the same participants. An exemplary pattern may include a teleconference, with a fixed set of participants, which meets weekly. The participants may speak in a set order that remains consistent each week. The exemplary context history 280 may, therefore, include the speaking order pattern, enabling context analyzer 250 to predict the next participant to speak in the real-time teleconference. Another exemplary pattern may include pauses of certain duration that are recognized by context analyzer 250 as a conversation waiting for a participant to speak. As new context patterns are identified by context analyzer 250, they may be added to the context history 280. In various embodiments, context analyzer 250 may utilize the context history 280 and teleconference conversation, input from natural language handler 240, to determine when a participant's input may be needed in the teleconference. Context analyzer 250 may signal notification handler 230 that a context history 280 pattern has been recognized.

In various embodiments, notification handler 230 may receive notification controls as input. For embodiments in which notification controls are voice activated, input may be received from natural language handler 240. In other embodiments, notification control input may be received as a result of button, key, or menu input on a telecommunication device 122. Notification handler 230 may set notification options for the telecommunication device 122 in response to the received notification controls. Notification options may include, but are not limited to, the notification mechanism (such as mechanical buzzers, beeps, flashing lights, screen messages, vibrations, recorded messages and selected sounds directed to the telecommunication device 122 speaker), the playback mode notification action (such as notification with immediate exit from playback mode or notification only), the enabling or disabling of all notifications, the enabling or disabling of playback mode notifications, the enabling or disabling of notifications while connected to the real-time teleconference, the enabling or disabling of all notification resulting from context clue 270 matches, the enabling or disabling of notifications resulting from specific context clue 270 matches, and the enabling or disabling of notifications resulting from recognized context history 280 pattern matches. In various embodiments, the notification mechanism may vary for the varying context matches. For example, a notification resulting from a name match may flash a light while a notification resulting from a context history 280 pattern match may direct a recorded message to the telecommunication device's 122 speaker.

Notification handler 230 may also receive signals from context analyzer 250 that a notification criterion has been met. The received signal may indicate that the context analyzer 250 matched the real-time teleconference conversation with context clues 270 or that context history 280 patterns may have been recognized. Notification handler 230 may activate a notification mechanism based on the notification options set for the telecommunication device 122. In certain embodiments, a notification may interrupt a playback in progress and reconnect the telecommunication device 122 to the real-time teleconference. In other embodiments, notification handler may simply activate the notification mechanism and continue in playback mode. In certain embodiments, such as teleconference system 124, notification handler 230 may recognize that the notification mechanism can not be activated because the participant to be notified has not joined the teleconference. In various embodiments, notification handler 230 may activate the notification mechanism as soon as the participant joins the teleconference.

A telecommunication device 122 may be a mobile phone, a teleconference system, a laptop computer, a notebook computer, a personal computer (PC), a desktop computer, a tablet computer, a thin client, or any other electronic device or computing system capable of performing the required functionality of embodiments of the disclosure. A telecommunication device 122 may include internal and external hardware components, as depicted and described in further detail with respect to FIG. 6. In other various embodiments of the present disclosure, a telecommunication device 122 may represent a computing system utilizing clustered computers and components to act as a single pool of seamless resources. In general, a telecommunication device 122 is representative of any programmable electronic device or combination of programmable electronic devices capable of executing machine-readable program instructions in accordance with an embodiment of the disclosure.

Figure 3:
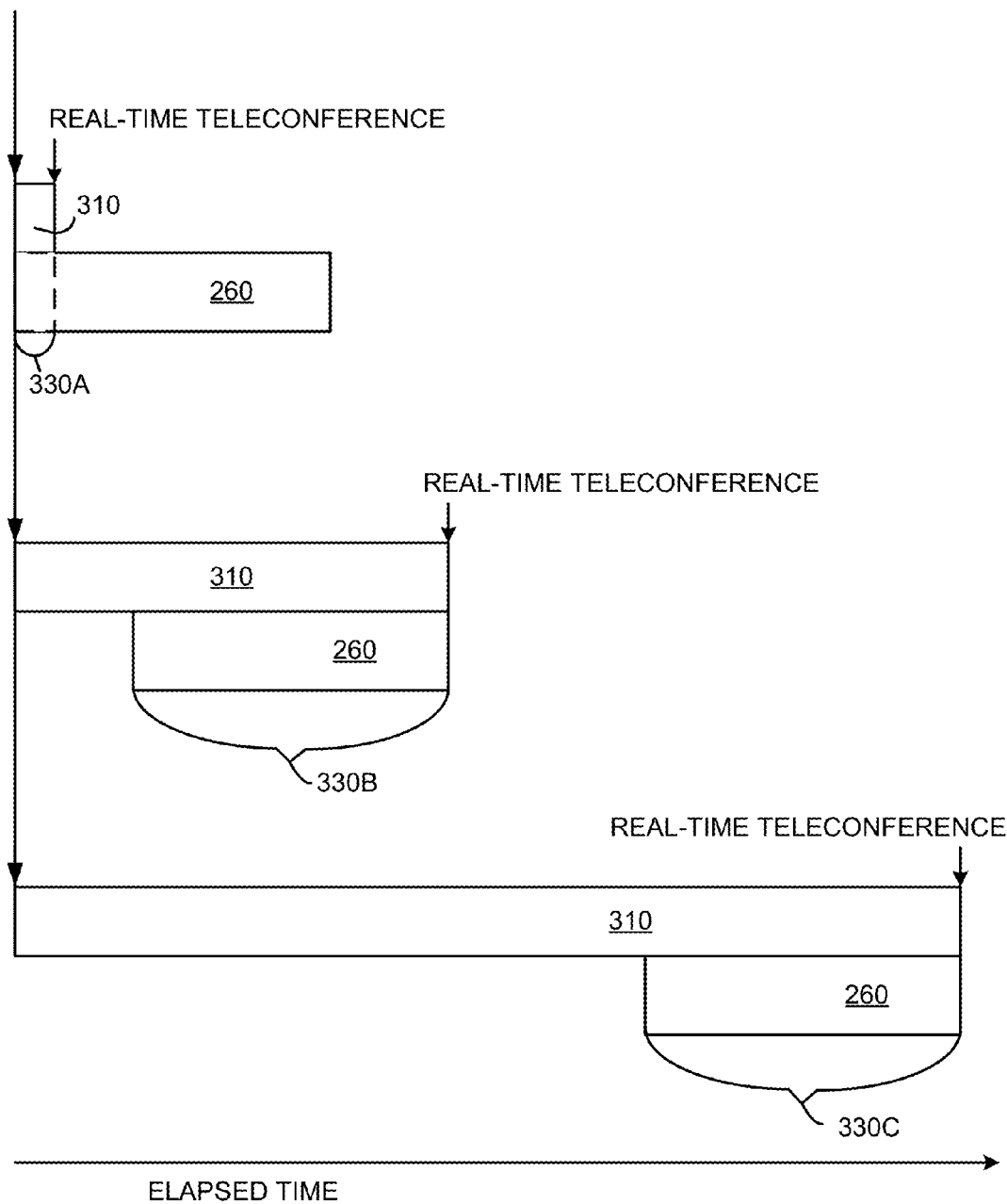
FIG. 3 is a diagram of an exemplary recorded teleconference, in accordance with an embodiment of the disclosure.

FIG. 3 is a diagram of an exemplary recorded teleconference 310, in accordance with an embodiment of the disclosure. The diagram depicts the recorded portion 330A, 330B, 330C of teleconference 310, recorded in playback buffer 260, over time. In the exemplary embodiment, playback buffer 260 may not have the capacity to record the entire teleconference 310. The recorded portion 330A, 330B, 330C of the teleconference 310 represents the maximum rewind capability of playback buffer 260. In various embodiments, playback buffer may be a circular buffer in which the oldest recorded conversation will be recorded over when the playback buffer 260 fills. At any time during the teleconference, the playback buffer 260 may be rewound only as far back as the start of the recorded portion 330A, 330B, 330C.

Early in a teleconference 310, when the elapsed time of the teleconference from start to real-time is less than the capacity of the playback buffer 260, the entire teleconference 310 may equal the recorded portion 330A in the playback buffer 260 and may be available for rewind and playback.

As the elapsed time of the teleconference 310, from start to real-time, grows, the recorded portion 330B, 330C, and thereby the playback ability, of the teleconference 310 may change. The rewind and playback may only be available for the most recent playback buffer 260 length portion of the teleconference 310. As time passes the part of the teleconference 310 recorded will change from recorded portion 330B to recorded portion 330C.

Figure 4:
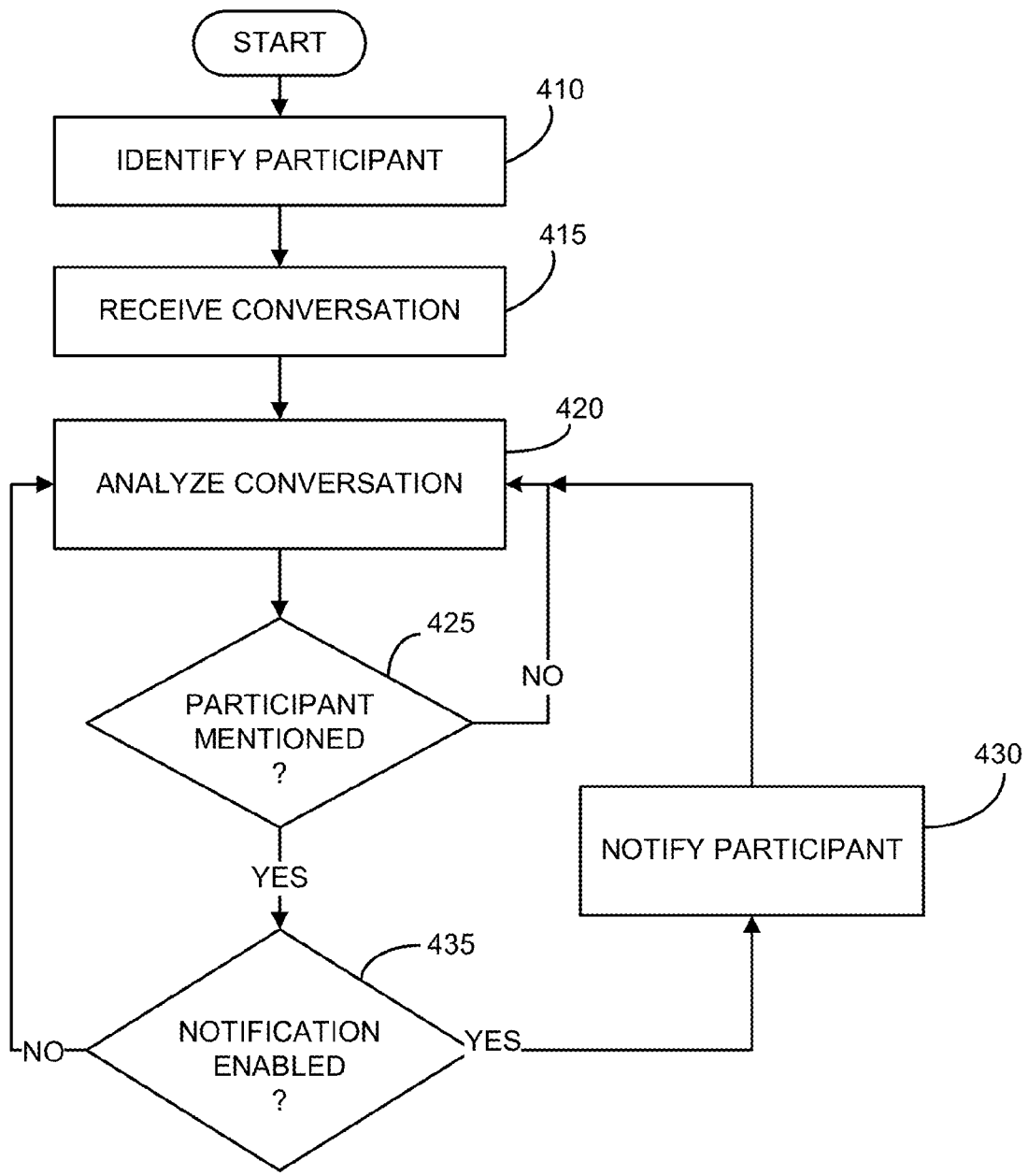
FIG. 4 is a flowchart illustrating the operation of a telecommunication device with intelligent notification, in accordance with an embodiment of the disclosure.

FIG. 4 is a flowchart illustrating the operation of a telecommunication device 122 with intelligent notification, in accordance with an embodiment of the disclosure. The telecommunication device 122 may, at 410, identify the participant associated with the telecommunication device 122 as they join a teleconference. In certain embodiments, the telecommunication device 122 may be a personal telecommunication device that maintains the participant information as context clues 270. In other embodiments, a participant may identify themselves to a teleconference system 124 as they join the teleconference. The telecommunication device 122 may receive the voice input of the real-time teleconference conversation via voice receiver 210, at 415. Natural language handler 240 along with context analyzer 250 may, at 420, monitor and analyze the natural language of the real-time teleconference conversation. Context analyzer 250 may determine, at 425, that the identified participant is mentioned in the real-time conversation. The analysis may utilize context clues 270 and context histories 280 to determine the context in which the participant is mentioned and whether the participant's input may be needed in the real-time teleconference. If the participant has not been mentioned, as determined at 425, context analyzer 250 continues to analyze the real-time conversation. If the analysis does recognize that the participant is mentioned, as determined at 425, and the telecommunication device's 122 notification options are enabled, as determined at 435 by the notification handler 230, the mentioned participant may be notified, at 430. Notifications to the participant may include, but are not limited to, tones, beeps, flashing lights, vibrations, and recorded messages. Participant mentions, determined during analysis may include, but are not limited to, participant name mentions, participant area of expertise mentions, participant location mentions, participant job title mentions, and recognition of patterns that indicate a participant's turn to speak. A telecommunication device 122 may have controls that allow each type of participant mention to be set independently. For example, a telecommunication device 122 may be enabled for a participant name mention but disabled for a job title mention. In addition, certain embodiments may also include controls that set the notification type, for each mention. For example, the participant name mention above may cause the telecommunication device 122 to vibrate, while recognition of a participant's turn to speak may flash a light. In certain embodiments a participant may join a teleconference already in progress and may be notified, immediately upon joining the teleconference, that they had been mentioned prior to joining. After the participant is notified, at 430, or when notification options have been disabled, as determined at 435, context analyzer 250 may continue to analyze the real-time teleconference conversation. As mentioned above, in certain embodiments, all or some of the components described in relation to FIG. 2 may be included in teleconference system 124.

Figure 5:
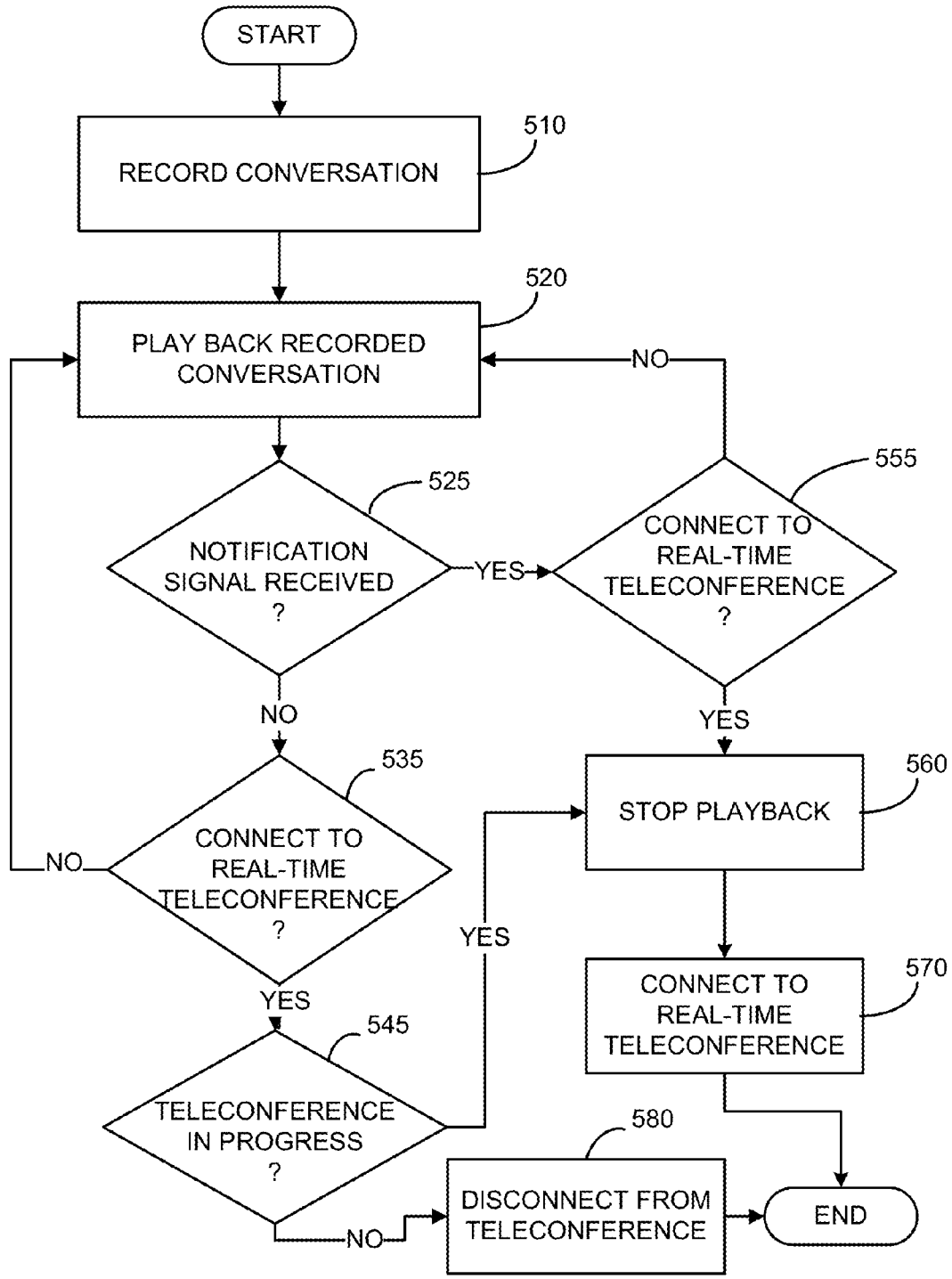
FIG. 5 is a flowchart illustrating the operation of intelligent notification in a telecommunication device with playback, in accordance with an embodiment of the disclosure.

FIG. 5 is a flowchart illustrating the operation of intelligent notification in a telecommunication device 122 with playback, in accordance with an embodiment of the disclosure. In various embodiments, telecommunications device 122, or teleconference system 124, may include a playback buffer 260 that records and plays back all or a portion of the teleconference, even while the teleconference may be in progress. The playback buffer 260 may record in a circular fashion such that a teleconference longer than the playback buffer 260 can hold may wrap and record over the earlier recorded conversation. The playback buffer 260 may continue to record even while the telecommunication device 122 is in playback mode, allowing the teleconference to be listened to, though delayed from the real-time teleconference. In various embodiments, the playback of all or a portion of the recorded teleconference conversation may commence at any point in the teleconference. Since the playback buffer 260 may wrap, portions of the teleconference conversation recorded over may not be available for playback. In various embodiments, a security feature may limit the number times a playback buffer 260 may be rewound for playback.

In various embodiments, telecommunication device 122, or teleconference system 124, may, at 510, record the teleconference conversation in the playback buffer 260. On a personal telecommunication device 122, recording may begin when the telecommunication device 122 connects to the teleconference. In certain embodiments, the telecommunication device 122 may notify all participants in the teleconference that the conversation may be recorded. In a teleconference system 124, recording may begin when the first participant joins the teleconference.

During the real-time teleconference, the playback buffer 260 may, at 520, be rewound and played back. The playback buffer 260 may be rewound to play back all or a portion of the teleconference conversation recorded in the playback buffer 260. The real-time teleconference may continue while the telecommunication device 122 is in playback mode. Telecommunication device 122 may receive a notification signal while in playback mode, similar to receiving a signal when connected to the real-time teleconference, if the context analyzer 250 determines that the participant has been mentioned in the real-time teleconference. If the telecommunication device 122, in playback mode, receives a notification signal, as determined at 525, the telecommunication device 122 may exit playback mode and reconnect with the real-time teleconference immediately, or may continue in playback mode. Notification options that determine the actions to be taken when a notification is received while in playback mode may be pre-set in the telecommunication device 122, may have default values, or may be set by notification controls. Certain embodiments may allow the playback buffer 260 to be fast-forwarded until real-time is reached.

If the telecommunication device 122 notification options are set to exit playback mode and reconnect to the real-time teleconference for the notification, as determined at 555, playback may be stopped, at 560, and the telecommunication device 122 may reconnect to the real-time teleconference, at 570. If the telecommunication device 122 notification options are not set to exit playback mode for the notification, as determined at 555, playback mode continues.

Telecommunication device 122 may reconnect to the real-time teleconference in response to playback controls such as exit playback and fast-forward. When telecommunication device 122 continues in playback mode, either because no notification signals have been received, as determined at 525, or notification options did not reconnect to the real-time conference after a notification, as determined at 555, and if playback controls are received to exit playback mode or to fast forward the playback buffer 260 to real-time, as determined at 535, record and playback handler 220 determines, at 545, if the real-time teleconference is still in progress. For a real-time teleconference that is still in progress, as determined at 545, playback may be stopped, at 560, and the telecommunication device 122 may reconnect to the real-time teleconference, at 570. For a real-time teleconference that has already ended while the telecommunication device 122 was in playback mode, as determined at 545, the telecommunication device 122 may, at 580, disconnect from the teleconference. If no playback controls are received at 535, playback mode continues.

Although aspects of the invention have been described in relation to an exemplary embodiment of a telephone network, those of skill in the art will recognize that other embodiments may be used. For example, the teleconference may be held using the internet, wireless network, or any communications network that allows participants to teleconference.

FIG. 6 depicts a block diagram of components of the telecommunication device 122 of the telecommunication environment 199 of FIG. 1, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Telecommunication device 122 can include one or more processors 620, one or more telecommunication device-readable RAMs 622, one or more telecommunication device-readable ROMs 624, one or more telecommunication device readable medium 630, device drivers 640, voice receivers 210, read/write drive or interface 632, and network adapter or interface 636, all interconnected over a communications fabric 626. Communications fabric 626 can be implemented with any architecture designed for passing data and/or control information between processors (such as microprocessors, communications and network processors, etc.), system memory, peripheral devices, and any other hardware components within a system.

One or more operating systems 628, natural language handlers 240, record and playback handlers 220, context analyzers 250, notification handlers 230, playback buffers 260, context clues 270, and context histories 280 are stored on one or more of the telecommunication device readable storage medium 630 for execution by one or more of the processors 620 via one or more of the respective RAMs 622 (which typically include cache memory). In the illustrated embodiment, each of the telecommunication device readable storage medium 630 can be a magnetic disk storage device of an internal hard drive, CD-ROM, DVD, memory stick, magnetic tape, magnetic disk, optical disk, a semiconductor storage device such as RAM, ROM, EPROM, flash memory or any other telecommunication device readable storage medium that can store a telecommunication device program and digital information.

Telecommunication device 122 can also include a R/W drive or interface 632 to read from and write to one or more portable telecommunication device readable storage medium 670. Natural language handler 240, record and playback handler 220, context analyzer 250, notification handler 230, playback buffer 260, context clues 270, and context history 280 on telecommunication device 122 can be stored on one or more of the portable telecommunication device readable storage medium 670, read via the respective R/W drive or interface 632, and loaded into the respective telecommunication device readable storage medium 630.

Telecommunication device 122 can also include a network adapter or interface 636, such as a TCP/IP adapter card or wireless communication adapter (such as a 4G wireless communication adapter using OFDMA technology). Natural language handler 240, record and playback handler 220, context analyzer 250, notification handler 230, playback buffer 260, context clues 270, and context history 280 on telecommunication device 122 can be downloaded to the telecommunication device from an external computer or external storage device via a network (for example, the Internet, a local area network or other, wide area network or wireless network) and network adapter or interface 636. From the network adapter or interface 636, the programs are loaded into the telecommunication device readable storage medium 630. The network may comprise copper wires, optical fibers, wireless transmission, routers, firewalls, switches, gateway computers, and/or edge servers.

Telecommunication device 122 can also include a display screen 650, a keyboard or keypad 660, a computer mouse or touchpad 655, a microphone 651, and notification mechanisms such as lights 654 and speakers 652. Device drivers 640 interface to display screen 650 for imaging, to keyboard or keypad 660, to computer mouse or touchpad 655, to display screen 650 for pressure sensing of alphanumeric character entry and user selections, to microphone 651 for receiving voice input, and/or to notification mechanisms such as lights 654, speakers 652, and display screens 650. The device drivers 640, R/W drive or interface 632, and network adapter or interface 636 can comprise hardware and software (stored in telecommunication device readable storage medium 630 and/or ROM 624).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for notifying a participant in a teleconference while the teleconference is in progress, the method comprising:

receiving, by a telecommunication device associated with a participant in a teleconference, live audio data representing natural language spoken during the teleconference in progress;

recognizing, by the telecommunication device associated with the participant in the teleconference, patterns of participant speaking order during the teleconference in progress, based on a consistent order in which the participant speaks during the teleconference in progress and previously recognized patterns of participant speaking order from a previous teleconference;

predicting, by the telecommunication device associated with the participant in the teleconference, the participant's turn to speak based on the recognized patterns;

recognizing, by the telecommunication device associated with the participant in the teleconference, language context in the received live natural language audio data from the teleconference in progress that identifies the participant, based on an initial language context known to identify the participant, which includes one or more of: the participant's name, the participant's area of expertise, the participant's location, and the participant's job title; and previously determined language context that identifies the participant;

recording, by the telecommunication device, the live natural language audio data from the teleconference in progress; and responsive to receiving, by the telecommunication device, a playback request from the participant, during the teleconference in progress:
  playing back, by the telecommunication device, a section of the recorded natural language audio data to the participant; and
  responsive to determining, by the telecommunication device, the participant is identified in the teleconference in progress by one or more of:
    the language context that identifies the participant is in the live natural language audio data of the teleconference in progress, and
    the prediction that it is the participant's turn to speak in the teleconference in progress, based on the recognized patterns;
    activating, by the telecommunication device, a notification to the participant that the participant is identified in the teleconference in progress, the notification comprising one or more of:
      an audible tone;
      a flashing light;
      a vibration; and
      a recorded message,
      wherein the one or more notifications activated are based on the language context that identifies the participant in the teleconference in progress, and the prediction that it is the participant's turn to speak.

2. The method according to claim 1, further comprising:
responsive to receiving a playback exit request, returning, by the telecommunication device, to the teleconference in progress.

3. The method according to claim 1, wherein the one or more notifications activated are further based on user control.

4. The method according to claim 1, wherein the telecommunication device is a personal telecommunication device or a conference system.

5. A computer program product for notifying a participant in a teleconference while the teleconference is in progress, the computer program product comprising one or more computer readable storage medium and program instructions stored on at least one of the one or more computer readable storage medium, the program instructions comprising:
  program instructions to receive, by a telecommunication device associated with a participant in a teleconference, live audio data representing natural language spoken during a teleconference in progress;
  program instructions to recognize, by the telecommunication device associated with the participant in the teleconference, patterns of participant speaking order during the teleconference in progress, based on a consistent order in which the participant speaks during the teleconference in progress and previously recognized patterns of participant speaking order from a previous teleconference;
  program instructions to predict, by the telecommunication device associated with the participant in the teleconference, the participant's turn to speak based on the recognized patterns;
  program instructions to recognize, by the telecommunication device associated with the participant in the teleconference, language context in the received live natural language audio data from the teleconference in progress that identifies the participant, based on an initial language context known to identify the participant, which includes one or more of: the participant's name, the participant's area of expertise, the participant's location, and the participant's job title; and previously determined language context that identifies the participant;
  program instructions to record, by the telecommunication device, the live natural language audio data from the teleconference in progress; and
  responsive to receiving, by the telecommunication device, a playback request from the participant, during the teleconference in progress:
    program instructions to play back, by the telecommunication device, a section of the recorded natural language audio data to the participant; and
    responsive to determining, by the telecommunication device, the participant is identified in the teleconference in progress by one or more of:
      the language context that identifies the participant is in the live natural language audio data of the teleconference in progress, and
      the prediction that it is the participant's turn to speak in the teleconference in progress, based on the recognized patterns;
      program instruction to activate, by the telecommunication device, a notification to the participant that the participant is identified in the teleconference in progress, the notification comprising one or more of:
        an audible tone;
        a flashing light;
        a vibration; and
        a recorded message,
        wherein the one or more notifications activated are based on the language context that identifies the participant in the teleconference in progress, and the prediction that it is the participant's turn to speak.

6. The computer program product according to claim 5, further comprising:
responsive to receiving a playback exit request, program instruction to return, by the telecommunication device, to the teleconference in progress.

7. The computer program product according to claim 5, wherein the one or more notifications are further based on user control.

8. The computer program product according to claim 5, wherein the telecommunication device is a personal telecommunication device or a conference system.

9. A computer system for notifying a participant in a teleconference while the teleconference is in progress, the computer system comprising one or more processors, one or more computer readable memories, one or more computer readable tangible storage medium, and program instructions stored on at least one of the one or more storage medium for execution by at least one of the one or more processors via at least one of the one or more memories, the program instructions comprising:

program instructions to receive, by a telecommunication device associated with a participant in a teleconference, live audio data representing natural language spoken during a teleconference in progress;

program instructions to recognize, by the telecommunication device associated with the participant in the teleconference, patterns of participant speaking order during the teleconference in progress, based on a consistent order in which the participant speaks during the teleconference in progress and previously recognized patterns of participant speaking order from a previous teleconference;

program instructions to predict, by the telecommunication device associated with the participant in the teleconference, the participant's turn to speak based on the recognized patterns;

program instructions to recognize, by the telecommunication device associated with the participant in the teleconference, language context in the received live natural language audio data from the teleconference in progress that identifies the participant, based on an initial language context known to identify the participant, which includes one or more of: the participant's name, the participant's area of expertise, the participant's location, and the participant's job title; and previously determined language context that identifies the participant;

program instructions to record, by the telecommunication device, the live natural language audio data from the teleconference in progress; and responsive to receiving, by the telecommunication device, a playback request from the participant, during the teleconference in progress:

program instructions to play back, by the telecommunication device, a section of the recorded natural language audio data to the participant; and responsive to determining, by the telecommunication device, the participant is identified in the teleconference in progress by one or more of:

the language context that identifies the participant is in the live natural language audio data of the teleconference in progress, and the prediction that it is the participant's turn to speak in the teleconference in progress, based on the recognized patterns;

program instruction to activate, by the telecommunication device, a notification to the participant that the participant is identified in the teleconference in progress, the notification comprising one or more of:

an audible tone;

a flashing light;

a vibration; and a recorded message, wherein the one or more notifications activated are based on the language context that identifies the participant in the teleconference in progress, and the prediction that it is the participant's turn to speak.

10. The computer system according to claim 9, further comprising:

responsive to receiving a playback exit request, program instruction to return, by the telecommunication device, to the teleconference in progress.

11. The computer system according to claim 9, wherein the telecommunication device is a personal telecommunication device or a conference system.

12. The method according to claim 1, further comprising:

storing, in the telecommunication device, after disconnecting from the teleconference, the recognized patterns of participant speaking order; and storing, in the telecommunication device, after disconnecting from the teleconference, the determined language context in the received live natural language audio data from the teleconference in progress that identifies the participant.

13. The computer program product according to claim 5, further comprising:

program instructions to store, in the telecommunication device, after disconnecting from the teleconference, the recognized patterns of participant speaking order; and program instruction to store, in the telecommunication device, after disconnecting from the teleconference, the determined language context in the received live natural language audio data from the teleconference in progress that identifies the participant.

14. The computer system according to claim 9, further comprising:

program instructions to store, in the telecommunication device, after disconnecting from the teleconference, the recognized patterns of participant speaking order; and program instruction to store, in the telecommunication device, after disconnecting from the teleconference, the determined language context in the received live natural language audio data from the teleconference in progress that identifies the participant.

\* \* \* \* \*